United States Patent [19]
Edmonds

[11] 3,889,841
[45] June 17, 1975

[54] LEAK AND CORROSION RESISTANT, YIELDABLE FREEZE PLUG

[75] Inventor: William H. Edmonds, Quanah, Tex.

[73] Assignee: J. L. Quisenberry, Quanah, Tex.

[22] Filed: Nov. 28, 1972

[21] Appl. No.: 310,160

[52] U.S. Cl. ............... 220/200; 123/41.5; 137/72; 123/41.15
[51] Int. Cl. ............................................. B65d 35/44
[58] Field of Search .......... 123/41.15, 41.5; 138/27, 138/32, 126, 127, 89, 118; 220/24 R, 24 A, 24.5, DIG. 19, 200; 137/59, 71, 72

[56] References Cited
UNITED STATES PATENTS

| | | | |
|---|---|---|---|
| 1,305,041 | 5/1919 | Westergaard | 123/41.5 |
| 1,867,351 | 7/1932 | Carpentier | 123/41.5 |
| 1,914,409 | 6/1933 | Draper | 220/24 A |
| 2,370,243 | 2/1945 | Henshaw | 137/72 |
| 2,503,944 | 4/1950 | Frascari | 220/24 R |
| 2,757,843 | 8/1956 | Smith | 220/DIG. 19 |

FOREIGN PATENTS OR APPLICATIONS

| | | | |
|---|---|---|---|
| 122,359 | 4/1931 | Germany | 123/41.5 |
| 187,924 | 4/1906 | Germany | 123/41.5 |
| 5,005 | 12/1893 | United Kingdom | 123/41.5 |

Primary Examiner—William I. Price
Assistant Examiner—R. E. Hart
Attorney, Agent, or Firm—Wayland D. Keith

[57] ABSTRACT

A freeze plug for a cooling system, which freeze plug is frictionally engaged within a machined, cored hole and which freeze plug may be removed and replaced. One form of the freeze plug is at least partially filled with elastomer material which is bonded thereto, and if corrosion should eat through the metallic portion of the freeze plug, the elastomer bonded thereto will prevent leakage, and further, if freezing of the fluid occurs, the freeze plug will yield and return to normal position. Another form of the invention utilizes a freeze plug which has a metallic friction member to engage within a machined hole, which hole is in fluid communication with the cooling system and which freeze plug is at least partially filled with an elastomer so the cooling fluid within the system will be in contact relation therewith, so upon the cooling fluid freezing and expanding, the elastomer will yield thereby to prevent damage to the engine block or the like, in which the freeze plug is located. The elastomer of the freeze plug is corrosion resistant.

5 Claims, 9 Drawing Figures

PATENTED JUN 17 1975   3,889,841

LEAK AND CORROSION RESISTANT, YIELDABLE FREEZE PLUG

BACKGROUND OF THE INVENTION

This invention relates to freeze plugs, and more particularly to a freeze plug for internal combustion engines, pumps and the like, which may be used as a standard plug in the manufacture of internal combustion engines and the like, or the plug may be used as an accessory item therefor.

SUMMARY OF THE INVENTION

The plug is designed to fit the standard cored holes in engine blocks, and when used as a freeze plug, will yield to prevent the engine block from bursting due to freezing. However, the present plug is so designed that corrosion will not impair the usefulness thereof, even though the metal portion of the plug has a hole eaten therethrough by corrosion. Since corrosion is the main cause of the failure of freeze plugs, the present plug is so designed as to overcome this defect and the plug will last for an indefinite period of time and give complete satisfaction.

PRIOR ART

Freeze plugs have been proposed heretofore, but these, for the most part, comprised a metal cup or a metal disc which was pressed into a machined core hole in the block of an engine, pump, or other machine element that is subject to being damaged because of freezing. The friction of the metal plug is supposed to be such that when the engine, pump or the like freezes, the cup or disc which forms the plug is expected to yield so that the expansion of the water due to freezing will not cause injury to the block, pump or the like.

U.S. Pat. Nos. 1,466,219 and 2,525,994 have been reviewed but lack certain advantages of the present corrosion and freeze protection plug.

SUMMARY OF THE INVENTION

The present plug serves the same purpose as plugs in use heretofore; however, in addition to the friction, an elastomer material such as synthetic rubber, plastic, rubber, or the like is bonded in fluid-tight relation within the cupped portion of the plug, in one form of the invention, so that when the metal corrodes sufficiently to allow the plug to leak, the elastomer furnishes a seal therefor which will prevent leakage. Furthermore, the elastomer in the plug will allow for expansion of the water, due to freezing, without pushing the plugs out of the core holes in the block.

OBJECTS OF THE INVENTION

An object of this invention is to provide a freeze plug, such as a cup or disc, which will prevent the cooling fluid from leaking from the engine, pump, or the protected mechanism, even though a hole is corroded through the freeze plug.

Another object of the invention is to provide a freeze plug on which an elastomer element is bonded to the cup portion thereof, which, when in contact with the cooling fluid, the plug becomes frozen, it will yield and prevent the bursting of the engine block or other element protected by the freeze plugs.

A further object of the invention is to provide a freeze plug which may be modified by filling an elastomer material into the cupped surface thereof, which elastomer material is bonded thereto, which enables any "standard" freeze plug to be so constructed as to replace freeze plugs now in use.

A still further object of the invention is to provide a modified freeze plug in sizes which will fit in standard, cored freeze plug holes in engine blocks, pumps and other machinery, in which a metal ring serves as a friction element within a hole to hold the plug in place and an opening within the metal portion of the plug exposes an elastomer bonded thereto, which is yieldable, to the cooling fluid which is susceptible to freezing.

BRIEF DESCRIPTION OF THE DRAWINGS

With these objects in mind, and others which will become manifest as the description proceeds, reference is to be had to the accompanying drawings, in which like reference characters designate like parts in the several views thereof, in which:

FIG. 5 shows a transverse sectional view through a modified form of the freeze plug, which shows the freeze plug filled with an elastomer material, and showing an opening therethrough to allow for expansion to the plug due to fluid pressure within the cooling system of an engine or the like;

DETAILED DESCRIPTION OF THE FIRST FORM OF THE INVENTION

Figure 1:
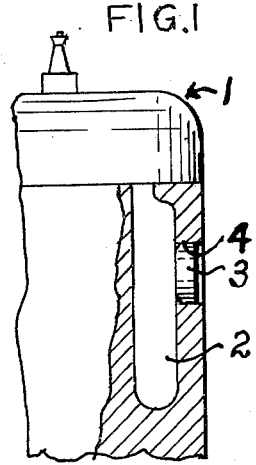
FIG. 1 is a fragmentary sectional view through a portion of an engine having the usual cored holes formed therein and showing a freeze plug installed therein with the present invention associated therewith.
Figure 2:
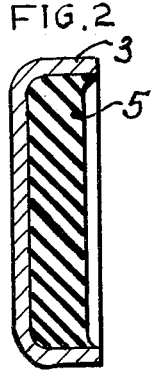
FIG. 2 is a greatly enlarged transfer sectional view through the freeze plug, showing an elastomer filler therein.

With more detailed reference to the drawings, particularly FIGS. 1, 2, 3 and 4, the numeral 1 designates generally an engine or other mechanical element having a cooling system 2 in which a freeze plug 3 is fitted in fluid-tight friction relation in hole 4, as will be seen in FIG. 1.

Freeze plug 3 is at least partially filled with an elastomer material 5, which is bonded thereto so in the event the metal portion of the freeze plug corrodes to such an extent as to normally cause leakage, the elastomer material 5 will prevent leakage of the cooling fluid therefrom.

Figure 3:
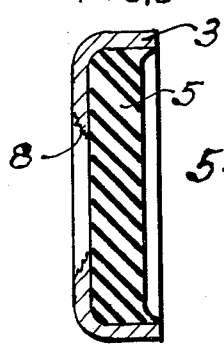
FIG. 3 is a view similar to FIG. 2, but showing a plug, a portion of which has been eaten away by corrosion.
Figure 4:
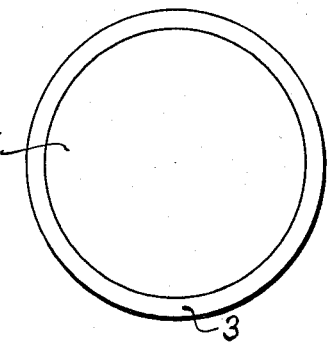
FIG. 4 is a view elevational taken from one side of the freeze plug showing an elastomer filler therein.

When the cupped plug 3 becomes corroded and has a hole 8 corroded thereinto, the elastomer material such as synthetic rubber 5 that is bonded to the inner cupped surface will prevent leakage, as will best be seen in FIG. 3.

DETAILED DESCRIPTION OF THE SECOND FORM OF THE INVENTION

Figure 5:
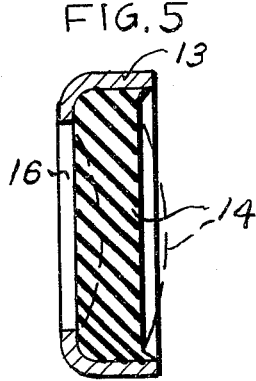
Figure 6:
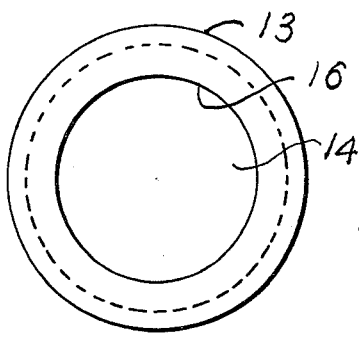
FIG. 6 is a view of the form of the invention as shown in FIG. 5, taken from one side of the freeze plug.
Figure 7:
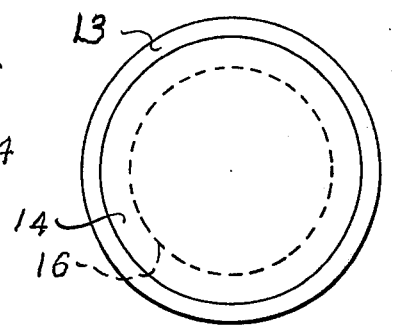
FIG. 7 is a view thereof taken from the opposite side of the freeze plug as shown in FIG. 6, showing the elastomer element material therein and bonded thereto.

The second form of the invention is shown in FIGS. 5, 6 and 7 wherein a cupped plug 13 is filled with an elastomer material 14, which elastomer material 14 is bonded to the inner cupped surface of the plug 13. This closes the opening 16 in the plug 13 so when the plug 13 is inserted into an opening such as shown in engine or the like 1, the cooling fluid is in fluid communication with the elastomer material 14. As the cooling fluid freezes and expands, the elastomer material 14 will yield as indicated in dashed outline in FIG. 5, which will prevent the expanded cooling fluid from bursting the block of an engine or other instrumentality using such protective freeze plugs. When the cooling fluids for the engine or like, thaws, the elastomer material 14 will return to the normal position as indicated in full outline in FIG. 5.

The elastomer material 14 is also resistant to corrosion and, under normal usage, will last much longer than a plug of corrosive metal.

It will be appreciated that when the cooling fluid thaws and the elastomer material returns to its normal position, no damage will have been done to the engine or the like, if a sufficient number of freeze plugs are within the cooling system. Furthermore, the present freeze plug can be made in interchangeable sizes with the freeze plugs provided in the present cooling systems and may be installed therein, in a minimum of time, to give a maximum of protection of the cooling system. Unlike other yieldable elements in cooling system, the present freeze plug is made in standard interchangeable sizes and the practice of the invention is not restricted to use in special engines having springs or bolted plates.

DETAILED DESCRIPTION OF THE THIRD FORM OF THE INVENTION

Figure 8:
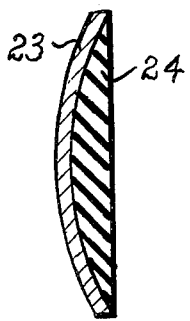
FIG. 8 is a transverse sectional view of modified form of the freeze plug in the form of a disc, showing an elastomer material within the cupped portion thereof and bonded thereto.
Figure 9:
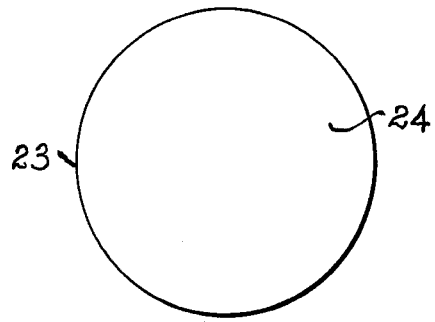
FIG. 9 is an elevational view, showing the elastomer therein, of the freeze plug as shown in FIG. 8.

A third form of the invention, as shown in FIGS. 8 and 9, utilizes a cupped metal disc 23 which has an elastomer filler 24 therein which is bonded thereto. Therefore, in the event of a hole becoming corroded in the metal of disc 23, elastomer material 24, which is bonded to the cupped portion of the disc 23 will prevent leakage of the cooling fluid therethrough.

Having thus described my invention, I claim:

1. In combination with a metal, cupped freeze plug,
  a. an elastomer material bonded within the cupped portion of the freeze plug,
    1. the cupped metal portion of the freeze plug is in the form of a disc, and
    2. the cupped portion of the disc is completely filled with an elastomer material.
2. A freeze plug as defined in claim 1; wherein
  a. the elastomer material filling the cupped portion of the freeze plug is synthetic rubber.
3. A freeze plug as defined in claim 1, wherein
  a. the elastomer material filling the cupped portion of the plug is synthetic resin plastic material.
4. The combination with a metal, cupped freeze plug as defined in claim 1; wherein
  a. the metal portion of the freeze plug has a hole formed therein;
  b. a portion of the elastomer material within the cupped portion of the freeze plug is in fluid communication with the cooling fluid, when the freeze plug is installed within a cooling system, so as to yield upon expansion of the cooling fluid, when the cooling fluid freezes,
    1. said elastomer material is bonded to the cupped side of the freeze plug in fluid tight relation, so as prevent leakage between the freeze plug and the elastomer material.
5. A freeze plug comprising;
  a. upstanding annular walls forming a recess, and
  b. an opening formed in the planar portion of the plug,
  c. elastomer material filled within the cupped portion in said upstanding sides, and being bonded thereto,
    1. a portion of the elastomer material being in fluid communication with the cooling fluid when the freeze plug is installed within a cooling system so as to yield upon expansion of the cooling fluid when the cooling fluid freezes.

* * * * *

UNITED STATES PATENT OFFICE
CERTIFICATE OF CORRECTION

Patent No. 3,889,841     Dated June 17, 1975

Inventor(s) William H. Edmonds

It is certified that error appears in the above-identified patent and that said Letters Patent are hereby corrected as shown below:

The assignee should read -- of one-half interest to Ruby Lee and of one-half interest to J. L. Quisenberry --.

Signed and Sealed this fourth Day of November 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,889,841  Dated June 17, 1975

Inventor(s) William H. Edmonds

It is certified that error appears in the above-identified patent and that said Letters Patent are hereby corrected as shown below:

The assignee should read -- of one-half interest to Ruby Lee Edmonds and of one-half interest to J. L. Quisenberry --.

This certificate supersedes Certificate of Correction issued November 4, 1975.

Signed and Sealed this eighteenth Day of May 1976

[SEAL]

Attest:

RUTH C. MASON
Attesting Officer

C. MARSHALL DANN
Commissioner of Patents and Trademarks